April 23, 1957 G. E. WILLETT 2,789,398
SEED TREATING PROCESS AND MATERIAL THEREFOR
Filed July 6, 1954
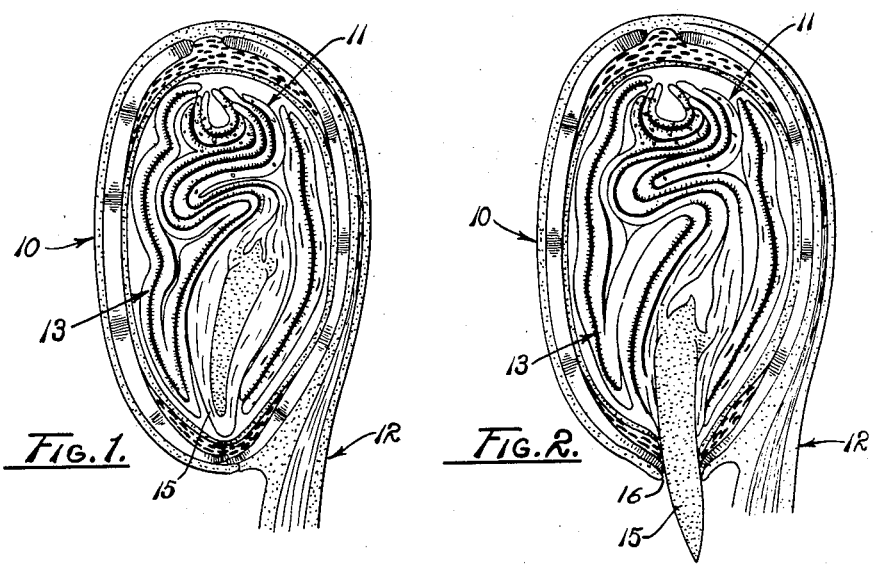
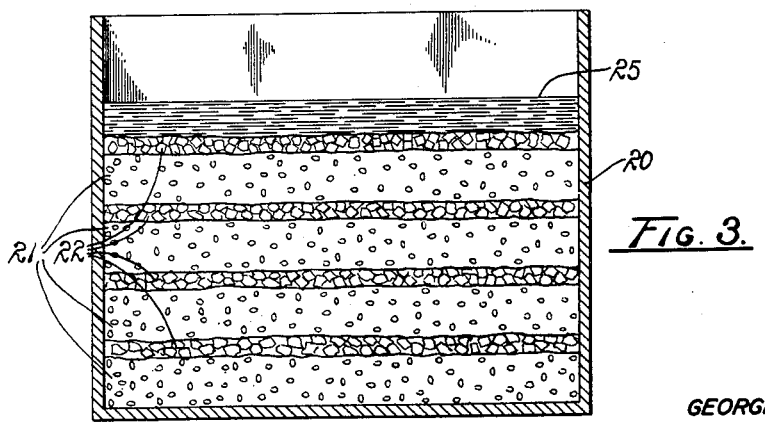
GEORGE E. WILLETT
INVENTOR
HUEBNER, BEEHLER,
WORREL & HERZIG
ATTORNEYS

United States Patent Office 2,789,398
Patented Apr. 23, 1957

2,789,398
SEED TREATING PROCESS AND MATERIAL THEREFOR

George E. Willett, Lemoore, Calif.

Application July 6, 1954, Serial No. 441,511

12 Claims. (Cl. 47—58)

The present invention relates to an improved method and material for seed treatment and more particularly, to a method and material for expediting the germination of plant seeds and stimulating initial plant growth.

There have been attempts in the past to assist the growth of plants and the germination of seeds by artificial means rather than relying solely upon nature to regulate such development. Stronger and healthier plants, greater yield, more resistance to damage by weeds, insects and the elements as well as the enabling of an earlier harvest are among the many advantages incident to the application of effective growth stimulants to plants.

With annually harvested crops, and in particular cotton, special problems exist which the present invention is successful in minimizing or overcoming. In the growing of cotton it is especially desirable to speed the germination of the cotton seed to enable ts fast emergence from the ground after being planted. Under ideal presently known growing conditions, it takes approximately fifteen to twenty-five days for cotton plants to emerge from the ground after the seed has been planted. During this elapsed period of approximately two to three weeks, it is essential that the layer of soil above the planted cotton seeds remain friable to enable easy emergence of the plant through the soil. However, rains over such an extended period in the usual spring planting season, are a rather frequent occurrence and cause the surface of the soil above the cotton seed to become crusty and hard. This layer of crusted soil acts as a barrier to the young cotton plants attempting to emerge from the ground and because such plants are so tender at such an earlier stage of growth, they are frequently unable to break through. It becomes necessary after such rains to cultivate this top layer of soil in order to render it again in a loose, porous condition or, if substantial damage has been done to the cotton plants as a result of this cultivation or their attempted emergence from a crusty soil, it is necessary to replant the entire field. Such replanting is a frequent requirement for cotton produced in many areas. This is obviously a time consuming and expensive procedure and for many cotton ranchers operating with limited capital is ruinous.

Another disadvantage of slow germination of cotton seeds results from the rather limited growing season of this semi-tropical plant when grown in temperate climates. This growing season is considered normally to be approximately one hundred and twenty days. Limits are placed upon the available growing time by late rains in the spring and early frosts in the fall. Thus, it is necessary to plant the cotton during a period in the spring when there is little likelihood that rain will fall and it is further necessary that the cotton reach full maturity prior to possible early frost. It is found that cotton seeds given affective stimulus in the initial germinating stages, not only emerge as plants more rapidly from the ground and thus have a better chance of avoiding possible rainfall but also the cotton reaches maturity at an earlier date well within a period prior to frost.

Although the above discussed problems are quite prevalent in the raising of cotton, the principles of this invention are not intended to be so limited and can advantageously be applied to various other types of seeds and the growing of plants therefrom.

Accordingly, it is an object of the present invention to stimulate the germination of plant seeds.

Another object is to reduce the time necessary for a plant to emerge from the ground after it has been planted and germination begun.

Another object is to speed the initial growth of plants to enable them to reach maturity at an earlier date than conventionally known growing methods achieve.

More specific objects are to minimize the damage to cotton plantings incident to rainfall prior to the emergence of the plants from the soil, to speed up the growth of young cotton plants, and to make possible the more effective utilization of the limited growing period for cotton.

Another object is to provide a process for treating seeds which conditions the seeds for speedier germination and imparts nutritive energy thereto for more rapid growth after germination.

Another object is to provide a process for treating seeds whereby the seeds are impregnated with a chemical composition including a fertilizer and a systemic carrier for conveying the nutrient constituents thereof throughout the system of the plant during its initial stages of growth.

Another object is to provide an improved material suited to the described purpose.

Another object is to stimulate the germination of seeds by rapid change of temperature of the seeds.

Another object is to impart insecticidal effects to plants by the treatment of seeds thereof prior to planting.

These and other objects will become more fully apparent upon reference to the subsequent description in the specifications.

In the drawings:

Fig. 1 is an enlarged longitudinal cross section taken through a cotton seed with its embryo at maturity.

Fig. 2 is a view similar to Fig. 1 but showing the seed during germination.

Fig. 3 s a vertcal section of a processing tank illustrating the conditioning of seeds therein according to the present invention.

Briefly, it has been discovered by the present invention that the pre-treating of seeds with a systemic carrying compound together with fertilizing materials in an aqueous solution while maintained at a temperature near, but above, freezing for a period sufficient substantially to saturate the seeds is highly effective in preconditioning the seeds for early germination and accelerated early growth. Within a short time after the seeds have been so treated, the seeds are placed in the ground by any normal method of planting. It has further been discovered that cooling the seeds to a temperature substantially that of freezing immediately prior to planting also stimulates germination independently of the systemic carrier or fertilizer. With the foregoing as a brief background to the invention, a more specific discussion follows.

The general well-known characteristic of a systemic compound when introduced into a plant is that it translocates or spreads throughout the system of the plant while the plant is growing. One well-known group of systemic chemicals are the organic phosphates, one of which is O, O-diethyl-O-2-ethyl thiophosphate, abbreviated hereinafter as the systemic carrier.

O, O-diethyl-O-2-ethyl thiophosphate is well known in its use as a systemic insecticide which, upon application by spray or otherwise, is absorbed by plants through the roots, leaves, stems and like parts for translocation throughout the system or growing tissues of the plant. It has been found by the present invention that upon certain prescribed treatment of seeds with the systemic carrier, the latter is absorbed into the seeds and will, after germination has begun, spread throughout the tissues of the growing plants and carry with it plant nutrient materials. The tissues of the plant take up the systemic compound from the seed until the initial charge absorbed into the seed has been fully utilized.

Of greater significance, however, is the discovery underlying the present invention that O, O-diethyl-O-2-ethyl thiophosphate acts as a carrier for fertilizing materials introduced into the seeds. When such systemic carrier is combined in aqueous solution with fertilizing materials and subsequently absorbed by the seeds, it carries the nutrient materials of the fertilizer throughout the system of the plant during its initial stages of growth thereby acting constantly to feed additional nutrient energy to the plant and at a more rapid rate.

The process for carrying out the principles of this invention consists briefly, in soaking the seeds in an aqueous solution of O, O-diethyl-O-2-ethyl thiophosphate and some suitable fertilizing material or materials possessing nutrient value in relation to the seeds treated. The seeds are permitted to remain in the aqueous solution including the systemic carrier and fertilizing chemicals until they are substantially thoroughly permeated or impregnated therewith. Subsequent to this treatment and preferably immediately thereafter, the seeds are planted or placed in a germinating environment. However this briefly described process when conducted at environmental temperatures existing at planting seasons, has been found to result in undesirable swelling and premature germination of the seeds during the treatment and prior to planting of the seeds. Such swelling is not particularly objectionable when small quantities are to be hand planted but constitutes a serious objection in large volume handling and mechanized planting. Further, when the seeds are soaked at approximately environmental temperature or higher and then placed in the ground where the temperature is somewhat lower or at least not substantially higher than the soaking temperature, the seeds apparently shrink and the normal germination process is impaired and sometimes permanently terminated. This is best explained by reference to Figs. 1 and 2 of the drawings wherein is shown the internal structure of a cotton seed.

In general, a cotton seed consists of an outer hull or spermoderm 10 and an inner kernel or embryo, generally indicated at 11. Moisture and various nutrient minerals are received into the embryo through the vascular bundle 12. The embryo of the seed shown in Fig. 1 is fully matured and the folds of the cotyledons, indicated at 13, almost completely fill the interior of the hull.

Upon germination, the root shoot 15 extends itself outwardly through the orifice 16 in the hull 10, known as the micropyle, as seen in Fig. 2. Thus, there is a spreading apart of the hull and further swelling of the embryo 11.

It has long been known that the embryo of a cotton seed is matured, by storage of the seed in a moist warm environment. When the practice of the present invention is carried out in an aqueous solution at environmental temperature, it has been discovered that swelling of the seed from a condition such as that shown in Fig. 1 to a condition such as shown in Fig. 2 (or at least approaching such condition) results. In short, germination has begun. Thereupon, when the seed is subsequently placed in the ground, normally at a temperature below atmospheric temperatures above the ground, the germination process is impeded. This causes buckling and unnatural shrinkage of the hull 10 and embryo 11. Oftentimes the germination process is completely frustrated or plant growth stunted by this reversal of temperature and plant development process.

The swelling and premature germination of the seeds is prevented by reducing the temperature of the aqueous solution wherein the seeds are treated to a temperature substantially below the temperature of the germinating environment or soil in which the seeds are to be subsequently placed and preferably, a temperature approaching that of freezing. When this additional step is added to the above described process, it is found that the seed is maintained in a tightly compact pre-shrunk condition such as that shown in Fig. 1. Due to the porosity of the seed, sufficient amounts of the systemic carrier and fertilizing chemicals are still absorbed into the seed through the vascular bundle 12. Thus, neither swelling nor germination occurs during the seed treating process and when the seeds are subsequently placed in the soil, they are subjected to a much warmer environment and thus are receptive to immediate germination. The chilled soaking and prompt planting also insures that the seeds are in a non-expanded durable handling condition for planting.

Assuming the treatment of cottonseed, a suitable tank or container 20 is provided and a first layer of delinted cottonseed of approximately six to eight inches in thickness, indicated at 21, is spread over the bottom of the tank. Next, a layer of crushed ice of approximately three inches in thickness, indicated at 22, is spread uniformly over the layer of seed. Succeeding layers of seed and crushed ice are in turn alternately placed in the tank until it is nearly filled. For the purposes of the present example and the proportions of the various constituents involved, it is assumed that approximately one hundred pounds of cottonseed are placed in the tank. An aqueous solution including a systemic carrying compound and fertilizing materials is next prepared. Examples of such solutions adequate for 100 lbs. of cottonseed which have been found excellently suitable for the purpose are as follows:

*Example 1*

Water _____kilograms__ 76
O, O-diethyl-O-2-(ethyl mercapto)-ethyl thiophosphate _____grams__ 14
Water soluble fertilizer_____kilograms__ 1.5

*Example 2*

Water _____kilograms__ 74
O, O-diethyl-O-2-(ethyl mercapto)-ethyl thiophosphate _____grams__ 14
Nitrogen (46% $NH_4NO_3$)_____do____ 1360
Manganese (36.4% $MnSO_4$)_____do____ 28
Zinc (22.7% $ZnSO_4.7H_2O$)_____do____ 42
Copper (25.4% $CuSO_4.5H_2O$)_____do____ 8
Iron (20.0% $FeSO_4.7H_2O$)_____do____ 56
Iodine (76.4% KI)_____do____ 6
Indoleacetic acid ($C_{10}H_9NO_2$)_____do____ 1
Napthaleneacetic acid ($C_{10}H_7CH_2CN$)____do____ 2
Captan (75% N-(trichloromethylthio)-4-cyclo-hexene-1, 2-dicarboximide)_____grams__ 42
Ammonium dihydrogen phosphate (61.7% $NH_4H_2PO_4$) _____grams__ 4
Cobalt ($CoSO_4.7H_2O$)_____do____ 2

Although the latter example has proved excellently suited to the purpose, it is not to be inferred from the extensive list of fertilizing agents (the last 11 listed constituents) that the present invention should be limited to such list. Such specificity is simply intended to illustrate a highly effective solution for seed treatment, it being understood that any desired fertilizer and systemic carrier therefor can be utilized without departing from the spirit or the scope of the invention.

This solution is then added to the tank 20 in which the alternate layers of seed and ice 21 and 22, respectively, have been placed as previously described and is indicated at 25. The seeds are permitted to soak in the solution for a period sufficient to permit substantially complete permeation or impregnation thereof with the aqueous solution including the ingredients above named. It has been found that for best results this period of treatment should last for approximately twenty-four hours. During this time, the ice maintains the temperature of the solution at approximately 35° F., thereupon imparting such a temperature to the seeds.

After the seeds have been sufficiently impregnated and cooled, they are removed from the tank preparatory to planting them. It has been found quite important to plant the seeds within at least about a twelve-hour period, or sooner if possible, after their removal from the treating solution. This recommended time lapse is significant from a temperature standpoint more than from that of dehydration inasmuch as it is desired to keep the temperature of the seeds substantially below that of the germinating environment of the soil.

Various tests have been carried out in determining the utility and relative effectiveness of the process and product of this invention. These tests are briefly described in the following paragraphs and demonstrate a remarkable improvement in the germination of seeds by the foregoing process and product.

For example, using the foregoing process as a basis, all of the steps described above were first carried out without incorporating the systemic carrier in the aqueous solution. The results of this test showed no effect in either the germination or early stages of cotton growth.

Next, the process was carried out without using any of the fertilizing materials and only incorporating the systemic carrier into the aqueous solution. Again, there appeared to be no influence exercised on the speed of germination or growth.

Further, the process was carried out as above described but maintaining the aqueous solution in a warm or tepid state, i. e. environmental temperature, and without cooling thereof. As previously discussed, this method speeds germination but is somewhat impractical for mechanical handling and disadvantageous in other respects because the seeds are excessively swelled and expanded before they are thoroughly saturated with the desired solution, and prior to their planting in the ground.

Additionally, the process was carried out without the utilization of either the systemic carrier or any fertilizing materials. Thus, this treatment consisted solely of icing the seeds for a period of time sufficient to reduce thoroughly and uniformly the temperature of the seeds so that they would remain in such a cooled or iced condition long enough to permit their subsequent planting in such condition. The results in this test showed appreciable speeding of germination but were not nearly as extensive as with the systemic carrier and fertilizer treatment combined with cooling, as described above.

Even so, this discovery of stimulating germination by temperature control is of appreciable significance inasmuch as it provides a simple and inexpensive manner of aiding germination. Apparently the physical effect being accomplished by first reducing the temperature of the seeds and then placing them in a germinating environment of substantially increased temperature is one of shock and the rapid contrast or increase in temperature gives an initial impetus to the germination process of the seed.

In marked contrast to the results of the foregoing experiments, cotton seeds chilled as described in layers of ice in the tank 20 while soaked in solutions illustrated by the examples given for a period of approximately twenty-four hours and which were planted within twelve hours following the chilling and soaking period germinated and emerged from the soil in approximately four days. The seeds removed from the tank are found to be hard and durable although thoroughly saturated with the desired solution and to remain in a durable condition for a period adequate for planting purposes. When the seeds are subjected to the increased atmospheric or soil temperature, they very rapidly swell and germinate. As soon as the young plant starts to grow, the systemic carrier assures prompt delivery of plant nutrient materials from the seed to all portions of the plant. The result is remarkedly accelerated growth and greater plant vigor and vitality. The accelerated growth incident to the distribution of the plant nutrient materials by the systemic carrier continues until either or both are exhausted. Obviously, the absorption capacity of the seeds is limited. However, the stimulated growth made possible by the present invention occurs when the plants are young and tender and most in need of assistance.

Contrasted with conventional practices in which cotton seeds lie dormant in the soil for from 15 to 25 days following their planting, the present invention has made possible the germination and emergence of the young cotton plants from the soil within four days of their planting time. In effect, this is equivalent to an extension of the growing season which advantage is made greater by the faster rate of plant growth following emergence. The actual advantage is found to be equivalent to an extension of the growing period for several weeks. Still further, the practice of the present invention assures the germination of the seeds and their emergence from the ground in such a brief period that even if a rain occurs a soil crust does not have adequate time to form and thus the difficulties thereof are avoided.

While the method and seed treating material of the present invention has been described in terms of particular ingredients, it is obvious that modifications and variations in the nature and proportions of the ingredients may be made without departing from the spirit and scope of the invention and only such limitations should be imposed as are implicit in the appended claims.

Having described my invention, what I claim as new and desire to secured by Letters Patent is:

1. A method for treating seed adapted to stimulate germination thereof comprising soaking the seed in the presence of ice in an aqueous solution containing a nutrient fertilizing material and a systemic carrier for the fertilizing material adapted to enter the sap of growing plants and to carry the fertilizing material therewith for a period sufficient to render the seed substantially thoroughly permeated with the fertilizing material and systemic carrier, removing the seed from the aqueous solution, and planting the seed at an environmental temperature appreciably above the temperature of the aqueous solution.

2. A method of treating seeds to stimulate the germination thereof and the initial speed of growth comprising soaking the seeds in an aqueous solution containing at least about two percent by weight of fertilizing material and O, O-diethyl-O-2-(ethyl mercapto)-ethyl thiophosphate as a systemic carrier for the fertilizing material in the presence of ice for a period of at least about twenty-four hours, removing the seed from the aqueous solution, and planting the seeds within a period of at least about twelve hours after their removal from the aqueous solution.

3. A method for treating cotton seed adapted to stimulate the germination thereof comprising arranging alternate layers of cotton seed and crushed ice in a container, the thickness of the ice layers being substantially one-half that of the seed layers, adding an aqueous solution containing fertilizing material and O, O-diethyl-O-2-(ethyl mercapto)-ethyl thiophosphate as a systemic carrier for the fertilizing material, soaking the seed in the aqueous solution in the presence of the ice for a period of at least about twenty-four hours, removing the seeds from the solution, and planting the seeds within a period of at least about twelve hours after their removal from the container.

4. A method of seed treatment adapted to stimulate germination thereof comprising cooling the seed to a temperature approximating but above that of freezing, impregnating the seed with a chemical consisting of a nutrient fertilizing material and a systemic carrier for the fertilizing material while maintained at said cooled temperature so that the seed is substantially thoroughly permeated with fertilizing material and systemic carrier and is in durable contracted condition, and planting the seed following its impregnation prior to any substantial swelling thereof incident to said impregnation or temperature rise following the cooling.

5. A method of treating seeds to stimulate the germination thereof and the initial speed of growth comprising soaking the seeds in an aqueous solution containing at least about two percent by weight of fertilizing material and a systemic carrier for the fertilizing material adapted to enter the sap of growing plants and to carry the fertilizing material therewith, in the presence of ice for a period of at least about twenty-four hours; removing the seeds from the aqueous solution; and planting the seeds within a period of at least about twelve hours after their removal from the aqueous solution.

6. A method for treating cotton seed adapted to stimulate the germination thereof comprising arranging alternate layers of cotton seed and crushed ice in a container; the thickness of the ice layers being substantially one-half that of the seed layers; adding an aqueous solution containing fertilizing material and a systemic carrier for the fertilizing material adapted to enter the sap of growing plants and to carry the fertilizing material therewith; soaking the seed in the aqueous solution in the presence of the ice for a period of at least about twenty-four hours; removing the seeds from the solution; and planting the seeds within a period of at least about twelve hours after their removal from the container.

7. A method of treating seeds to stimulate the germination and initial speed of growth thereof comprising soaking the seeds in an aqueous solution containing a liquid fertilizing material and O, O-diethyl-O-2-(ethyl mercapto)-ethyl thiophosphate as a systemic carrier for the fertilizing material at a temperature above but approximately freezing.

8. A method for treating seeds adapted to stimulate germination and initial speed of growth thereof comprising impregnating the seeds with an aqueous solution containing a nutrient fertilizing material and O, O-diethyl-O-2-(ethyl mercapto)-ethyl thiophosphate as a systemic carrier for the fertilizing material, chilling the seed during the impregnating thereof to a temperature approximating but above the freezing temperature of water to maintain the seed in durable contracted condition, and planting the seed while in said contracted condition.

9. A method for treating seed adapted to stimulate germination and the initial speed of growth thereof comprising soaking the seed in an aqueous solution approximating but above the freezing temperature of water which contains a nutrient fertilizing material and O, O-diethyl-O-2-(ethyl mercapto)-ethyl thiophosphate as a systemic carrier for the fertilizing material for a period sufficient to render the seed substantially thoroughly permeated with the fertilizing material and systemic carrier, removing the seed from the aqueous solution, and planting the seed at an environmental temperature appreciably above the temperature of the aqueous solution.

10. A method of treating seeds to stimulate the germination thereof and the initial speed of growth comprising soaking the seeds in an aqueous solution containing at least about two percent by weight of fertilizing material and O, O-diethyl-O-2-(ethyl mercapto)-ethyl thiophosphate as a systemic carrier for the fertilizing material at a temperature approximating but above the freezing temperature of water for a period sufficient thoroughly to impregnate the seed with the aqueous solution while the seed is maintained in a durable contracted condition by the temperature of the solution, removing the seed from the aqueous solution, and planting the seeds while in said contracted condition.

11. A method of treating seeds to stimulate the germination thereof and the initial speed of growth comprising soaking the seeds in an aqueous solution at a temperature above but approximating freezing containing a fertilizing material and O, O-diethyl-O-2-(ethyl mercapto)-ethyl-thiophosphate as a systemic carrier for the fertilizing material for a period sufficient to render the seed substantially thoroughly permeated, and planting the seed at an environmental temperature appreciably above the temperature of the aqueous solution prior to any substantial swelling of the seed as a result of temperature rise following soaking.

12. A method of treating seed adapted to stimulate germination thereof comprising soaking the seed in a solution containing a nutrient fertilizing material and a systemic carrier for the fertilizing material adapted to enter the sap of growing plants and to carry the fertilizing material therewith for a period sufficient to render the seed substantially thoroughly permeated with fertilizing material and systemic carrier, maintaining the solution at approximately freezing temperature throughout said period, removing the seed from the solution, and planting the seed at an environmental temperature appreciably above the temperature of the solution.

References Cited in the file of this patent

UNITED STATES PATENTS

| Number | Name | Date |
|---|---|---|
| 292,015 | Jaques | Jan. 15, 1884 |
| 914,430 | Lafer | Mar. 9, 1909 |
| 968,013 | White | Aug. 23, 1910 |
| 1,846,510 | Busse | Feb. 23, 1932 |
| 1,939,951 | Buchanan | Dec. 19, 1933 |
| 2,083,065 | Heyl | June 8, 1937 |
| 2,492,153 | Hull | Dec. 27, 1949 |
| 2,571,989 | Schrader | Oct. 16, 1951 |
| 2,596,076 | Hook | May 6, 1952 |
| 2,611,728 | Bartlett | Sept. 23, 1952 |

OTHER REFERENCES

Farmers' Bulletin 1329, published June 1923 by U. S. Department of Agriculture, on "The Boll-Weevil Problem," pages 24, 26.

Introduction to "Plant Physiology" (Curtis et al.). Published by McGraw-Hill (N. Y.) 1950, pages 571–579, 623, 624.

Van Overbeek, "Agricultural Application of Growth Regulators . . . ," Published before November 17, 1952 by Annual Reviews, Inc., in vol. 3 of Annual Review of Plant Physiology, pages 87–108.

Chemical Abstracts, 1953 Subject Index, vol. 47, pages 331–S, published December 25, 1953.